United States Patent
Butt et al.

[11] Patent Number: 6,142,518
[45] Date of Patent: Nov. 7, 2000

[54] DUAL INFLATOR APPARATUS INCLUDING PYROTECHNIC INFLATOR

[75] Inventors: Ron J. Butt, Castle Rock; Royce M. Strickland, Jr., Parker; Charles B. Kafadar, Littleton, all of Colo.

[73] Assignee: OEA, Inc., Aurora, Colo.

[21] Appl. No.: 08/986,255

[22] Filed: Dec. 5, 1997

[51] Int. Cl.⁷ .................................................. B60R 21/26
[52] U.S. Cl. ........................ 280/741; 280/736; 280/742
[58] Field of Search .................................. 280/741, 736, 280/742, 735

[56] References Cited

U.S. PATENT DOCUMENTS

| | | | |
|---|---|---|---|
| 3,672,699 | 6/1972 | Dewindt | 280/150 AB |
| 3,758,131 | 9/1973 | Stephenson et al. | 280/150 AB |
| 3,767,002 | 10/1973 | Gillund | 180/102 |
| 3,767,228 | 10/1973 | Lewis | 280/150 AB |
| 3,773,352 | 11/1973 | Radke | 280/150 |
| 3,797,354 | 3/1974 | Poole et al. | 280/150 |
| 3,797,854 | 3/1974 | Poole et al. | 280/150 |
| 3,868,126 | 2/1975 | Radke et al. | 280/150 |
| 3,901,530 | 8/1975 | Radke | 280/150 |
| 3,966,224 | 6/1976 | Campbell et al. | 280/735 |
| 4,136,894 | 1/1979 | Ono et al. | 280/729 |
| 4,243,248 | 1/1981 | Scholz et al. | 280/735 |
| 4,620,721 | 11/1986 | Scholz et al. | 280/735 |
| 4,984,651 | 1/1991 | Grosch et al. | 180/268 |
| 4,998,751 | 3/1991 | Paxton et al. | 280/741 |
| 5,022,674 | 6/1991 | Frantom et al. | 280/741 |
| 5,031,932 | 7/1991 | Frampton et al. | 280/741 |
| 5,033,390 | 7/1991 | Minert et al. | 102/530 |
| 5,071,160 | 12/1991 | White et al. | 280/735 |
| 5,076,607 | 12/1991 | Woods et al. | 280/737 |
| 5,330,226 | 7/1994 | Gentry et al. | 280/735 |
| 5,348,344 | 9/1994 | Blumenthal et al. | 280/737 |
| 5,351,988 | 10/1994 | Bishop et al. | 280/737 |
| 5,470,104 | 11/1995 | Smith et al. | 280/737 |
| 5,558,367 | 9/1996 | Cuevas | 280/737 |
| 5,564,743 | 10/1996 | Marchant | 280/741 |
| 5,582,806 | 12/1996 | Skanberg et al. | 422/305 |
| 5,589,141 | 12/1996 | Sides et al. | 422/164 |

FOREIGN PATENT DOCUMENTS

| | | |
|---|---|---|
| 04 006192 A | 1/1992 | Japan . |
| 08 080799 A | 3/1996 | Japan . |
| WO 96/10001 | 4/1996 | WIPO . |

*Primary Examiner*—Eric Culbreth
*Attorney, Agent, or Firm*—Sheridan Ross P.C.

[57] ABSTRACT

An inflation apparatus that includes at least two inflators for selected use in inflating an air bag is disclosed. In one embodiment, the two inflators include a micro hybrid inflator and a pyrotechnic inflator. The micro hybrid inflator includes a pressurized medium having oxygen that contributes to the inflation gases that fill the inflatable. The pyrotechnic inflator is essentially free of any such stored gas. Both inflators include a fuel-rich gas generating material. In another embodiment, instead of a micro hybrid inflator, another pyrotechnic inflator is utilized that includes an oxygen-rich gas generating material. In still another embodiment, a fluid fuel acts as a source of oxygen for the fuel-rich gas generating material of the pyrotechnic inflator. When both inflators of the dual inflation apparatus are activated, the oxygen gas that is present is used in further combusting products of combustion from the pyrotechnic inflator having the fuel-rich gas generating material. Preferably, activation of each inflator depends upon whether the vehicle collision that results in air bag activation is low impact or high impact. In at least one embodiment, the two inflators can be affixed to a support assembly with a desired arrangement of the inflators to provide a low profile and reduced space usage by the inflation apparatus.

24 Claims, 12 Drawing Sheets

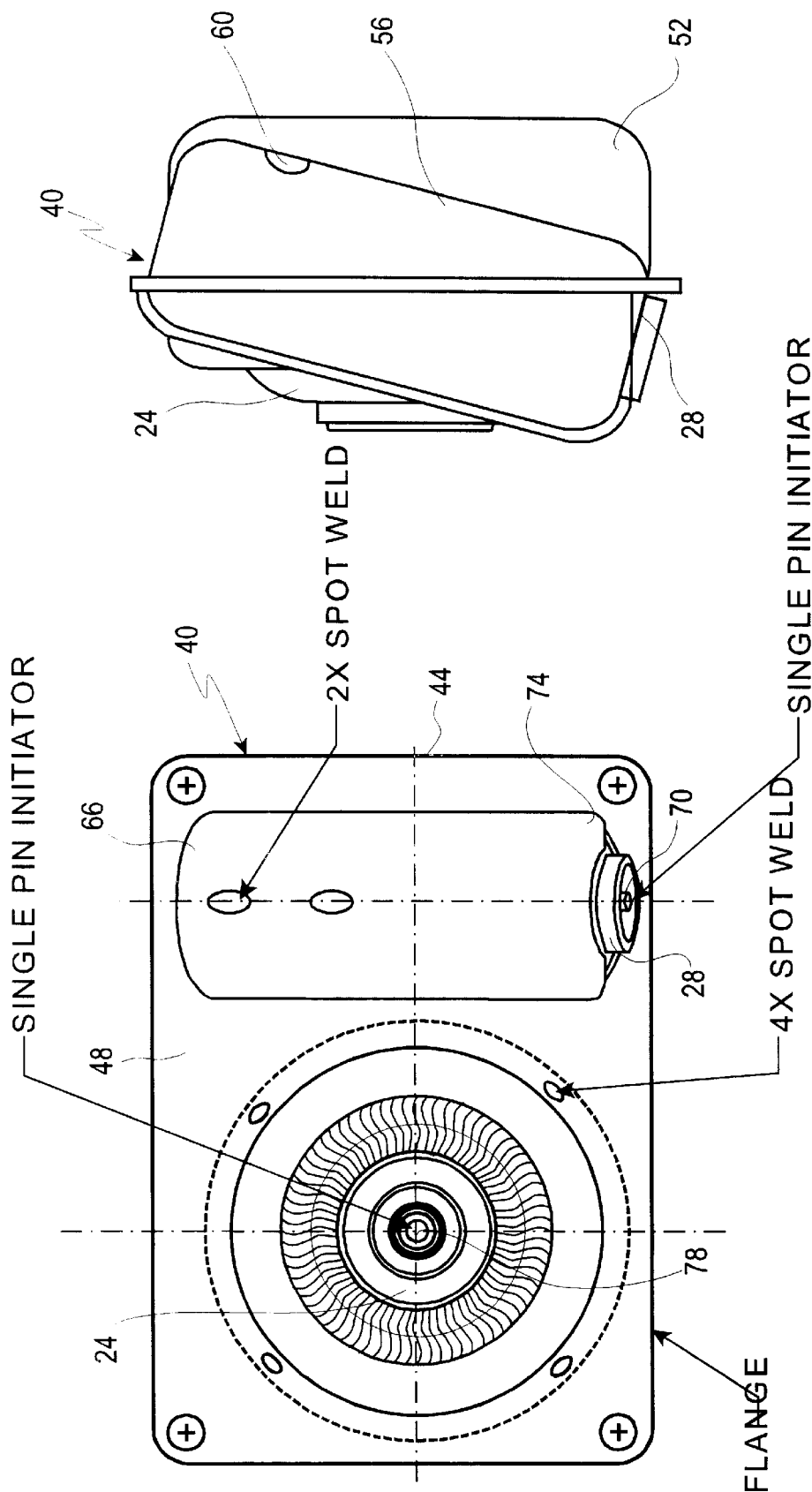

OEA PYRO/HYBRID DUAL STAGE INFLATOR

DUAL INFLATOR APPARATUS INCLUDING PYROTECHNIC INFLATOR

FIELD OF THE INVENTION

The present invention relates to inflators for automotive safety systems and, in particular, to an inflator apparatus that has two or more inflators and may include different types of inflators.

BACKGROUND OF THE INVENTION

Inflators of various designs and configurations have been devised for use with air bag modules that are mounted in vehicles. Upon activation of the inflator, inflation gases are generated for pressurizing or filling the air bag. Inflators can be generally categorized in different groups or types. A hybrid inflator includes stored pressurized gas that acts with gases generated by a combustible propellant to generate inflation gases for filling the air bag. A pure or all pyrotechnic ("pyro") inflator refers to an inflator in which substantially entirely all of the gases for filling the air bag are propellant gases generated by a solid gas-generating propellant composition. There is no need to store a pressurized gas and the inflator is substantially free of a stored, pressurized gas.

It is also known to incorporate more than one inflator in an inflator system. That is, multiple including dual inflator systems have previously been advanced. Multiple inflators have particular application in inflator systems that operate differently, depending upon whether or not the collision involving the vehicle having the inflator system is characterized as a high impact or low impact vehicle collision. In that regard, the air bag of such an inflator system is designed to inflate when a threshold impact to the vehicle occurs or is exceeded. Different vehicle impacts can occur. According to one set of criteria or definitions, vehicle collisions can be characterized as being low impact or high impact. A low impact collision typically occurs when the impacted vehicle is traveling at a relatively low rate of speed. Relatedly, a low impact collision can occur when an impacting vehicle is traveling at a relatively low rate of speed when it strikes the impacted vehicle. Conversely, a high impact collision is commonly characterized by one or both of an impacted and impacting vehicle traveling at a relatively high rate of speed. The pressure developed in the air bag need not be the same for the low and high impact collisions. When a high impact collision occurs, it is desirable to inflate the air bag to a relatively high pressure while, with a low impact collision, it is desirable to inflate the air bag to a lesser pressure. Relatedly, depending upon the age and/or size of the vehicle occupant, it may be advantageous to control the pressure applied by the air bag. For young or small children, it is usually desirable to utilize less pressure in the air bag than when the vehicle occupant is an adult or a larger sized individual.

Inflation systems have been described that are intended to take into consideration such factors as the degree of vehicle impact, age and/or size of the vehicle occupant and/or the position of the occupant in the vehicle. In one prior art system, multiple gas generating units for filling an air bag with gas can be selectively activated. More than one such unit is activated when it is desirable to provide relatively increased pressure in the air bag. In another known prior art system, an electrically controlled vent valve, together with two igniters, are used. The vent valve provides a pathway for gases different from the pathway to inflate the air bag. Based on this configuration, if the electronic controller maintains the vent valve closed and fires each of the two igniter, the air bag inflates with 100% of the gas that is generated. On the other hand, for example, if the vent valve is controlled open and only one of the two igniter is fired, the air bag is inflated with a fraction of the maximum possible gas that could be provided.

Although the prior art describes systems and designs involved with controlling the inflation of an air bag, it would be beneficial to incorporate a relatively less complex arrangement that satisfies the key requirements associated with controlling the inflation of an air bag, including relying on components that are already available or are used in such a system, making as few modifications as is necessary to the air bag module and keeping the addition of parts thereto as few as possible.

SUMMARY OF THE INVENTION

In accordance with the present invention, an apparatus for inflating an air bag in a vehicle is disclosed. The apparatus includes a plurality of inflators including at least first and second inflators. In a preferred embodiment, the first inflator includes a micro hybrid inflator having a first gas generating material and a pressurized medium. Preferably, such gas generating material contains a fuel-rich component and the pressurized medium contains significant oxygen, in the range of about 2–30%. By fuel-rich, it is meant that the component contains oxygen in its molecular structure, if at all, in an amount that is smaller than the stoichiometric amount of oxygen that would be required, during a self-sustained combustion reaction, to convert all hydrogen that may be in the component to water and to convert all carbon that may be in this component to carbon dioxide. If the fuel-rich component were combusted alone, it would, therefore, produce gaseous decomposition products including a significant amount of carbon monoxide and/or hydrogen, both of which are undesirable for purposes of inflating an inflatable bag of a vehicle safety restraint system. Particularly preferred for use as the fuel-rich component or fuel-rich materials are gun-type propellants because gun-type propellants are readily available, relatively inexpensive, and their burn characteristics are well understood. Gun-type propellants, as used herein, are high-temperature, fuel-rich components such as single, double, or triple-based propellants; and nitramine propellants such as LOVA (low vulnerability ammunition) and HELOVA (high energy, low vulnerability ammunition). More specifically, gun-type propellants are fuel-rich and have a combustion temperature ranging from about 2,500° K to about 3,800° K and typically greater than about 3,000° K. Examples of suitable gun-type propellants include nitramine-based propellants having as major ingredients RDX (hexahydrotrinitrotriazine) or HMX (cyclotetramethylenetetranitramine). PETN (pentaerythritol tetranitrate) and TAGN (triamianoguanidinenitrate) could also serve as major ingredients in gun-type propellants. Other suitable gun-type propellants include those incorporating tetrazole-based compounds, and triazole-based compounds. Most preferred as the fuel-rich component is RDX in a gun-type propellant.

The second inflator includes a pyrotechnic inflator having a second or pyrotechnic gas generating material that is also preferably fuel-rich. The pyrotechnic inflator does not have any pressurized medium that functions with the inflation gases produced by the second gas generating material when the air bag is filled with inflation gases. Each of the micro hybrid and pyrotechnic inflators is suitably positioned relative to an air bag module. In one embodiment, each is mounted or otherwise held by a support assembly that is adaptable to be positioned adjacent to the air bag module.

In one embodiment, the micro hybrid inflator and pyrotechnic inflator are designed for a driver side application in a vehicle. The micro hybrid inflator has a housing that is different from and reduced in size in comparison with the conventional driver side hybrid inflator. Similarly, the size and housing of the pyrotechnic inflator is different from and reduced in size relative to previously devised or utilized pyrotechnic inflators. In a first embodiment for a driver side application in a vehicle, the support assembly includes a flange assembly having an upper flange and a lower flange that are joined together after proper positioning of the micro hybrid inflator and the pyrotechnic inflator. The lower flange has a surface adjacent to which gas exits the inflator (gas-exiting surface) and an opposite side surface. The outlet or diffuser end of the micro hybrid inflator is joined to the gas-exiting surface. The body of the micro hybrid inflator extends in a direction away from the opposite side surface of the lower flange. The pyrotechnic inflator is received in a cover member extending from the gas-exiting surface. The cover member has an orifice that communicates with the outlet of the pyrotechnic inflator. The upper flange has a raised section with common outlets. When both the micro hybrid and the pyrotechnic inflators are activated, for example, the inflation gases generated by these two inflators escape or are released from the common outlets. The upper flange defines a mixing chamber in which the inflation gases from the micro hybrid and pyrotechnic inflators are mixed before escaping the common outlets. Since the micro hybrid inflator has substantial amounts or volume of oxygen and the pyrotechnic inflator has a fuel-rich propellant, the products of combustion from the pyrotechnic gas generating material are further combusted using gases generated and output from the micro hybrid inflator to provide additional inflation gases for delivery to the air bag.

In a second embodiment of a driver side application in a vehicle that does not have an upper flange with mixing chamber, the support assembly includes a single flange having a substantially planar outer surface. The outer surface is the surface adjacent to which initiator assemblies of the inflators are accessible for appropriate electrical connections related to activation thereof when appropriate to ignite the different propellants of the inflators. The initiator assembly of the micro hybrid inflator is located adjacent to the outer surface and extends outwardly in a direction away from the outer surface. The initiator assembly of the pyrotechnic inflator is disposed at an angle relative to this outer surface.

The support assembly also has a cover member with an opening extending adjacent to the outer surface of the flange. A lower or body member is joined to the flange and extends in the same direction as the body of the micro hybrid inflator. The body member has a concave section formed within its interior, which engages housing portions of the pyrotechnic inflator. Preferably, the concave section is configured to enable the initiator assembly of the pyrotechnic inflator to be accessible through the opening in the cover member. In accordance with this configuration, the pyrotechnic inflator is at an oblique angle relative to the planar outer surface of the flange in which the initiator assembly of the pyrotechnic inflator is on one side of the outer surface of the flange and the opposite end of the pyrotechnic inflator is on the other, opposite side of the flange within the body member. In this way, the longitudinal extent of the micro hybrid inflator is essentially perpendicular to the planar outer surface, while the longitudinal extent of the pyrotechnic inflator is not only at an oblique angle but also extends in a direction along the outer surface of the flange.

Each of these two inflators has a controllable outlet. The outlet for the micro hybrid inflator is on the opposite end of the inflator from the initiator assembly. The outlet for the pyrotechnic inflator is formed along its cylindrical sidewall. At least portions of the pyrotechnic inflator outlet communicate with an orifice formed in portions of the body member. When these two inflators of this embodiment are activated, the resulting products of combustion including inflation gases are combined in the air bag, where further inflation gases are produced, due to the mixing of the fuel-rich products of combustion from the pyrotechnic inflator and the oxygen-rich combustion products including inflation gases from the micro hybrid inflator.

In another embodiment, the micro hybrid inflator and the pyrotechnic inflator are designed for a passenger side application in a vehicle. In one configuration thereof, the pyrotechnic inflator is joined to the outlet and/or diffuser assembly of the micro hybrid inflator. This passenger side inflator has the diffuser assembly located at the opposite end of the longitudinal extent of the inflator housing from the initiator assembly. When this micro hybrid inflator is activated using the initiator assembly, inflation gases pass to the diffuser assembly, from which they exit for passage into the air bag. The pyrotechnic inflator includes an inflator housing that is connected to the diffuser assembly, such as by welding. The pyrotechnic inflator housing contains a pyrotechnic gas generating material that is fuel-rich. When the pyrotechnic inflator is activated, products of combustion including inflation gases are produced, with such products of combustion being further combusted when received by the diffuser assembly of the micro hybrid inflator, where such products of combustion are mixed or otherwise combined with inflation gases from the activated micro hybrid inflator. Such further combustion is result of the relatively significant oxygen content of the inflation gases from the micro hybrid inflator and the resulting combustion products from the fuel-rich pyrotechnic gas generating material of the pyrotechnic inflator.

With respect to the manner of operation of these different embodiments, both the driver side and passenger side applications have a number of similarities. In the preferred embodiment, the micro hybrid inflator is activated to supply inflation gases to the air bag when a vehicle collision detection apparatus senses each of a low impact collision and a high impact collision. The micro hybrid inflator is activated whenever the vehicle having the air bag to be filled experiences a collision that exceeds a predetermined, relatively lower impact threshold or level. The pyrotechnic inflator, on the other hand, is activated only when a high impact collision is detected. Consequently, in the case of a high impact vehicle collision, both the micro hybrid inflator and the pyrotechnic inflator are activated to provide relatively more inflation gases to the air bag in relatively less time, in comparison with when only the micro hybrid inflator is activated. Furthermore, the inflation gases output by the micro hybrid inflator, when combined with, or in the presence of, pyrotechnic inflation gases, results in some further combustion of pyrotechnic combustion products whereby a more complete combustion of the propellant or gas generating material in the pyrotechnic inflator is accomplished.

Substantial descriptions related to the operations and functioning of the micro hybrid inflator are based on related embodiments or designs of the assignee of the present application. Such descriptions and explanations can be found, for example, in U.S. Pat. No. 5,553,889 issued Sep. 10, 1996 and entitled "HYBRID INFLATOR WITH RAPID PRESSURIZATION-BASE FLOW INITIATION ASSEMBLY" and U.S. patent application Ser. No. 08/680,273 filed Jul. 11, 1996 and entitled, "HYBRID INFLATOR."

In still another embodiment, instead of one of the two inflators being a hybrid inflator, both inflators are pyrotechnic inflators; however, the two pyrotechnic inflators are not identical. At least the pyrotechnic gas generating material or propellant in each of these two pyrotechnic inflators is different. The pyrotechnic gas generating material of a first of these two pyrotechnic inflators is characterized by the amount or volume of oxygen it produces when ignited or activated. This first pyrotechnic gas generating material produces more oxygen per weight thereof than the second of the two pyrotechnic inflators. Preferably, in the context of the percentage of gases being produced as a result of the activation of such propellant, the oxygen gas is in the range of about 2–30% of the gas that results after activation of such propellant. A representative example of such an oxygen-producing pyrotechnic inflator is described in U.S. Pat. No. 3,797,854. The second pyrotechnic inflator is characterized by the fuel-rich nature of the propellant. Such a fuel-rich propellant is expected to produce at least about 30% carbon monoxide (CO) and, in the absence of combining the gases resulting from the activation of the fuel-rich propellant with gases produced by the pyrotechnic gas generating material of the first pyrotechnic inflator, the standard for acceptable carbon monoxide (ppm)in the vehicle would be exceeded.

In another embodiment, instead of the gas generating material being in solid form, the gas generating material is a fluid (i.e. liquid or gas) fuel that is ignitable and expandable to create inflation gases. The relatively oxygen-rich inflation gases of this fluid fuel inflator are mixable with the fuel-rich products of combustion from the pyrotechnic inflator of the dual inflator apparatus to further combust the same and produce more inflation gases.

Based on the foregoing summary, a number of important features of the present invention are readily discerned. A dual inflation apparatus is provided in which, when both inflators are activated, oxygen-rich products of combustion including inflation gases are combined with fuel-rich products of combustion including inflation gases. A number of embodiments for generating such products of combustion are advanced. The oxygen-rich products of combustion can be produced by a hybrid inflator with solid propellant, a hybrid inflator with a fluid fuel and/or an oxygen-rich pyrotechnic propellant. The combining or mixing of these products of combustion, regardless of the source of the oxygen-rich products of combustion, can occur in a number of configurations, including one or more of using a mixing chamber of a support assembly for the two inflators, a diffuser assembly associated with one of the inflators and in the inflatable itself.

With respect to actual activation of the two inflators, when a high impact collision is detected, both of the different inflators are activated to supply gases for filling the inflatable. When a low impact collision is detected, only one of these two inflators is activated so that reduced pressure is developed in the inflatable. Preferably, the parts of the inflator apparatus in a driver side application are arranged so that the volume of the space occupied by the apparatus is relatively small. In that regard, the arrangement of the inflator's components on a support assembly has an optimum profile. The pyrotechnic inflator preferably does not increase the profile or height of the resultant inflator apparatus over that height which is due to a driver side micro hybrid inflator.

Additional advantages of the present invention will become readily apparent from the following discussion, particularly when taken together with the accompanying drawings.

BRIEF DESCRIPTION OF THE DRAWINGS

FIG. 2 illustrates a top view of one embodiment of a driver side micro hybrid inflator and a pyrotechnic inflator in which products of combustion are mixed in the inflatable itself;

FIG. 3 is a side view of the inflation apparatus illustrated in FIG. 2;

DETAILED DESCRIPTION

Figure 1:
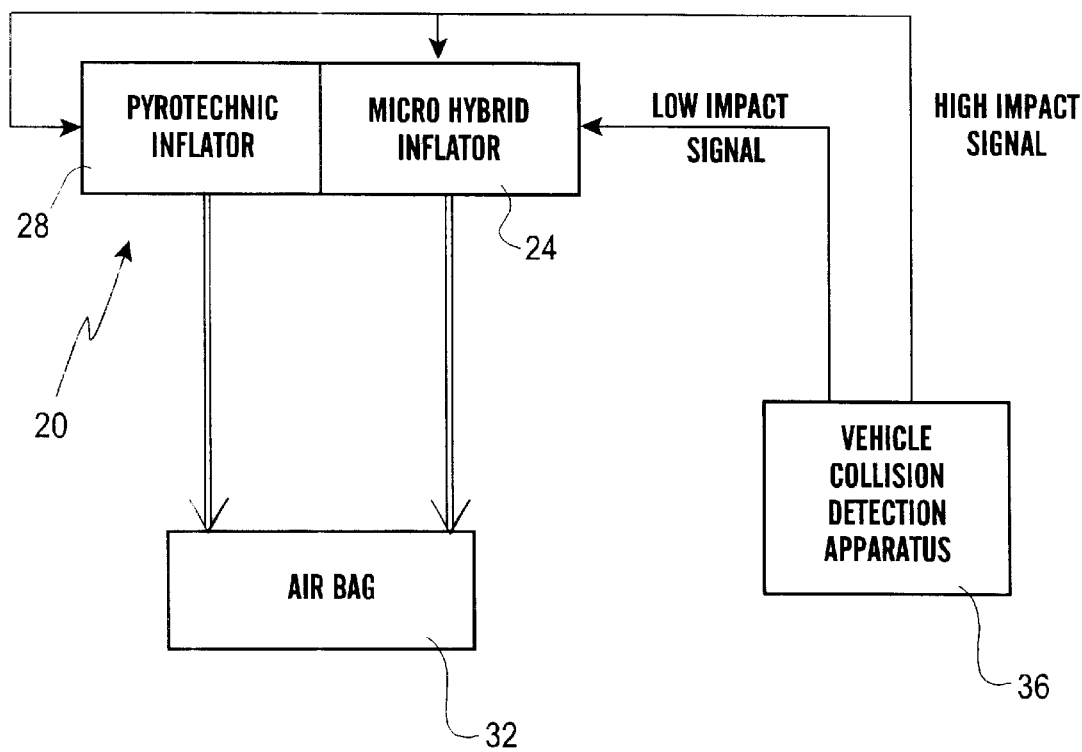
FIG. 1 is a block diagram representative of major components of an inflation system provided in a vehicle in which an inflation apparatus includes a micro hybrid inflator and a pyrotechnic inflator.

With reference to FIG. 1, a schematic diagram of an inflator system is illustrated for use in a vehicle. The inflator system is characterized by an inflation apparatus 20 which includes multiple inflators and with two or dual inflators 24, 28 being illustrated. In a preferred embodiment, the first inflator 24 is a micro hybrid inflator and the second inflator 28 is a pyrotechnic inflator. Each of the two inflators, when activated, outputs products of combustion including inflation gases to an air bag or inflatable 32. The air bag 32 is commonly part of an air bag module that is connected to the inflation apparatus 20.

Generally, the micro hybrid inflator 24 includes a gun-type, fuel-rich gas generating material or propellant and a pressurized medium. The pressurized medium preferably consists essentially of a predetermined ratio of oxygen and inert, such as argon, gases. The pyrotechnic inflator 28 includes a gas generating material that is also preferably a gun-type, fuel-rich propellant. Unlike the micro hybrid inflator 24, the pyrotechnic inflator 28 does not include a pressurized medium and therefore is substantially free of pressurized, stored gas. Under the conditions when both inflators 24, 28 are ignited to create inflation gases for filling the air bag 32, the combustion products including inflation gases from the fuel-rich gas generating material of the pyrotechnic inflator 28 are combined or further combusted with the oxygen-rich combustion products including inflation gases of the micro hybrid inflator 24. This interaction or reaction results in a more complete combustion of the pyrotechnic gas generating material and with the pressure in the air bag 32 being increased more rapidly. Additionally, toxic gas levels, specifically based on CO and $No_x$, are eliminated, or substantially eliminated, when both inflators 24, 28 are activated.

With regard to the functional relationship between the micro hybrid and pyrotechnic inflators 24, 28, respectively, the micro hybrid inflator 24 is required to typically produce 60%–80% of the maximum, combined output related to inflation gases, upon activation of this inflator. Based on this, the gun-type, fuel-rich propellant of the pyrotechnic inflator 28 is in the range of about 0.8–2.8 grams for the driver side pyrotechnic inflator and about 2.4–5.6 grams for the passenger side pyrotechnic inflator. The propellant weights for these pyrotechnic inflators are in the range of 20%–90% of the weights of the gun-type propellant of the micro hybrid inflator 24. With these weights of propellants, certain amounts of carbon monoxide (CO) are produced. One gram of the typical combusted gun-type propellant normally produces about 0.017 moles of CO. This means that for a typical inflator (100 $ft^3$ or 126 moles of gas), the CO concentration would range from about 162–378 ppm for a driver side pyrotechnic inflator 28. Additionally, the micro hybrid inflator 24 produces as much as 30 ppm of CO. The total CO concentration of the micro hybrid and pyrotechnic inflators, when activated, would be about 192–408 ppm. A common requirement for CO concentration allowed in the vehicle is 150 ppm for the dual driver side inflator apparatus. For the dual passenger side inflator apparatus, the concentration of CO is in the range of about 354–786 ppm. The common requirement for CO concentration for the passenger side inflator is about 300 ppm. Because of the unwanted differences between acceptable concentration and the concentration actually produced by such propellant weights, it is necessary that there be sufficient oxygen to convert all the minimum CO moles to carbon dioxide ($CO_2$). To accomplish this, for the driver side pyrotechnic inflator, it is determined that the inflation gases, (pressurized medium gases, plus gases from ignited gas generating materials) must practically include at least 2% oxygen. The maximum amount of oxygen should be no greater than about 30% to avoid fire hazards associated with high oxygen levels. The same range of 2%-about 30% oxygen is required as well for the passenger side dual inflator apparatus. As will be discussed later herein, testing has shown that most of the CO is converted using oxygen at an exit temperature from the inflator apparatus to the air bag 32 in the range of 1000° K–1600° K, although prior to such testing, there was no reasonable certainty that the temperature of the oxygen from the micro hybrid inflator 24, together with the short time (about 50 milliseconds) for reaction time, as well as the limited mixing available for carbon dioxide and oxygen, would be sufficient to convert most of the carbon monoxide.

In a preferred application of the inflation apparatus 20, each of the inflators 24, 28 is activated when different predetermined conditions occur. As illustrated in FIG. 1, the inflation system also includes a vehicle collision detection apparatus 36, which electrically communicates with each of the two inflators 24, 28. The detection apparatus 36 typically includes previously devised or implemented hardware that senses the occurrence of the vehicle impact or collision. In accordance with one set of criteria, the conventional vehicle collision detection apparatus 36 outputs signals, based on the degree of vehicle collision or impact, such as a low impact collision signal and a high impact signal. Briefly, the low impact signal is generated or output when a first predetermined level or threshold is reached related to vehicle impact, such as the vehicle impacting another vehicle or an object or being impacted by another vehicle. Similarly, the high impact signal is generated or output when a second predetermined level of impact is experienced by the vehicle, which is greater than the low impact collision. In accordance with the embodiment of FIG. 1, the micro hybrid inflator 24 is activated when the vehicle collision detection apparatus 36 senses a low impact condition and outputs a low impact signal to the micro hybrid inflator 24. The low impact signal triggers an initiator assembly in the micro hybrid inflator 24 that subsequently causes the gas-generating material therein to be ignited. Upon activation, the micro hybrid inflator 24 outputs inflation gases produced by the gas-generating material and the stored gas to the air bag 32 to inflate it to a desired relatively lower pressure. In the case of the low impact collision being experienced by the vehicle, the pyrotechnic inflator 28 is not activated so that only inflation gases generated by the micro hybrid inflator 24 are utilized in filling the air bag 32.

When the vehicle is subject to a high impact collision, on the other hand, both inflators 24, 28 are activated. More specifically, the vehicle collision detection apparatus 36 senses this condition, based on a predetermined degree of collision being sensed and generates a high impact signal that is applied to both the micro hybrid inflator 24 and the pyrotechnic inflator 28. As should be understood, the high impact signal can be applied to the two inflators 24, 28 at the same time, or substantially at the same time, or a delay may be included so that they are activated at different times in connection with desired filling of the air bag 32 in a differently-controlled manner (for intermediate impact collisions).

With reference to FIGS. 2 and 3, an embodiment is illustrated for arranging and supporting a micro hybrid inflator 24 and a pyrotechnic inflator 28 using a support assembly 40. This support assembly 40 includes a flange 44 having a planar outer or upper surface 48. A body member 52 is integral with the flange 44 and extends in the same direction as the body of the micro hybrid inflator 24. The body member 52 has a concave region that establishes an area within the body member 52 for supporting the housing of the pyrotechnic inflator 28. The body member 52 has an orifice formed in the concave region 56 to allow for the escape of inflation gases when the pyrotechnic inflator 28 is activated. The support assembly 40 also includes a longitudinal, arcuate cover member 66 having a length substantially equal to the length of the housing of the pyrotechnic inflator 28. The pyrotechnic inflator 28 is joined to the overlying cover member 66 by means of suitably-placed spot welds. A pyrotechnic initiator pin 70 is exposed adjacent to an opening 74 in the cover member 66. The pyrotechnic initiator pin 70 is in electrical communication with each of the low impact signal and the high impact signal, when a selected one of them is output by the vehicle collision detection apparatus 36. The other electrical contact can be a shell coaxial with the pin, or a second pin (not shown).

In the embodiment illustrated, the inflation apparatus 20 is designed for a driver side application so that the micro hybrid inflator 24 is a driver side designed inflator. Similar to the pyrotechnic inflator 28, the micro hybrid inflator 24 has a hybrid initiator pin (or pins) 78 accessible from adjacent the outer surface 48 of the flange 44; however, unlike the pyrotechnic initiator pin 70 that extends at an oblique angle relative to the outer surface 48, the hybrid initiator pin 78 is normal to the plane of the outer surface 48. The driver side micro hybrid inflator 24 is joined to the flange 44 by means of a number of spot welds about the circumference of the body of the micro hybrid inflator 24.

It is advantageous to maintain a relatively small volume and low profile of the inflation apparatus to optimize the size thereof since space is a premium in connection with incorporating the inflation apparatus 20 on the side of the vehicle. In that regard, the length of the pyrotechnic inflator 28 is arranged in a direction along the outer surface 48 of the flange 44 so as not to increase the height or profile of the inflation apparatus. That is, this arrangement does not increase the profile over that which results from the driver side micro hybrid inflator 24 that is disposed to extend in a direction perpendicular to the plane of the outer surface 48.

When the inflation apparatus 20 is activated, in the use of both the hybrid and pyrotechnic inflators 24, 28, in one embodiment, the inflation gases output from the two inflators 24, 28 are combined in the air bag 32 itself. Further desired combustion of the products of combustion from the two inflators results from the interaction of these two outputs.

Figure 4:
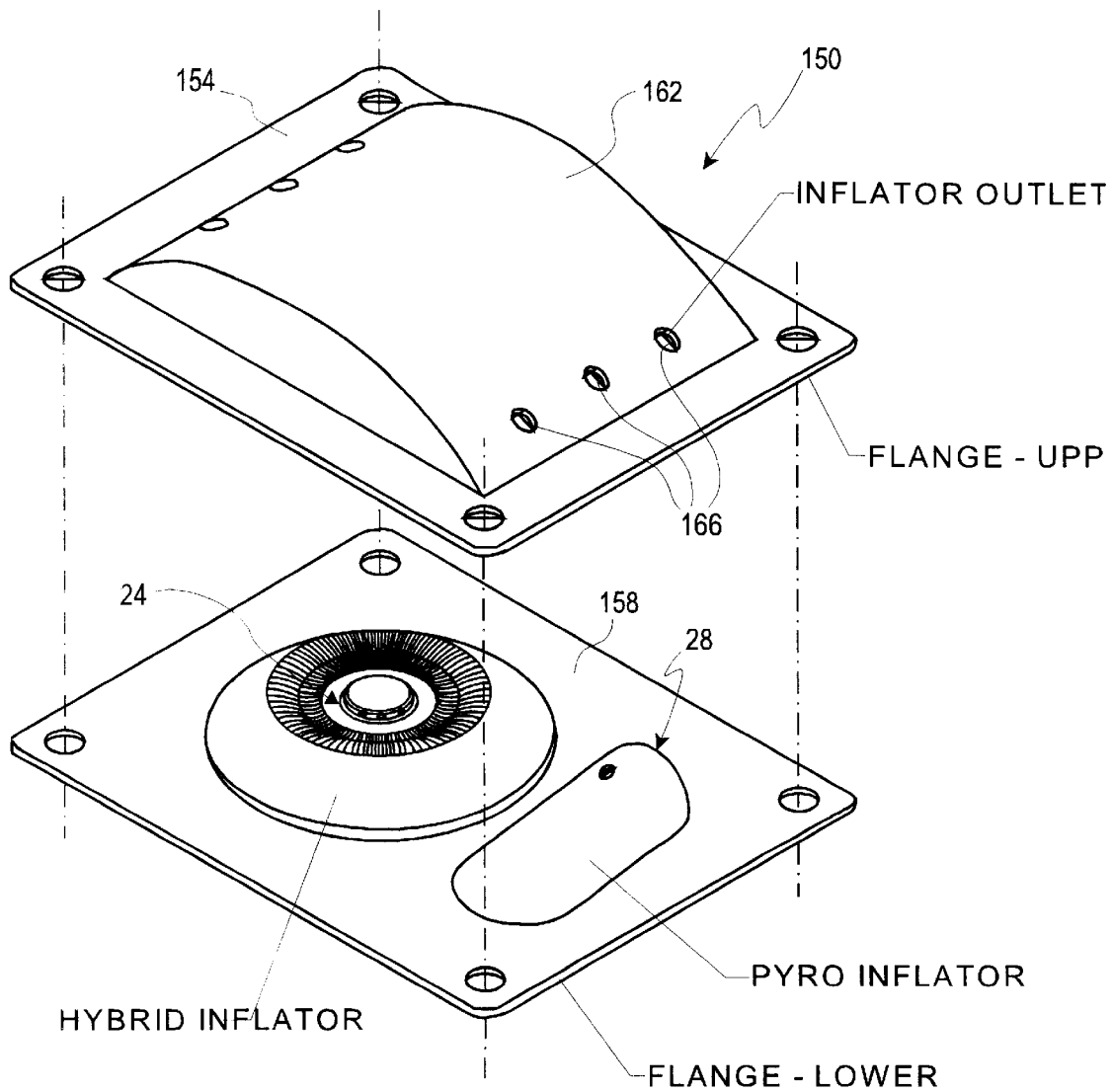
FIG. 4 illustrates an exploded view of one embodiment of a driver side micro hybrid inflator and pyrotechnic inflator in which products of combustion are mixed in a chamber before escaping to the inflatable.

In another embodiment, instead of such reactions substantially occurring in the air bag 32, such interactions or reactions substantially occur before the products of combustion including the inflation gases reach the air bag 32. With reference to FIG. 4, such an embodiment is representatively accomplished by means of a flange assembly 150 that includes an upper flange 154 and a lower flange 158 that can be interconnected using fasteners or the like. The micro hybrid inflator and the pyrotechnic inflator 28 are arranged on the lower flange 158 in a manner described in conjunction with the embodiment of FIGS. 2 and 3. Unlike the embodiment of FIGS. 2 and 3, an upper flange 154 is provided that has a raised section 162, which provides a mixing chamber that is defined by the inner convex surface thereof. That is, when the upper and lower flanges 154, 158 are connected and the two inflators 24, 28, are activated, output products of combustion including inflation gases from the two inflators 24, 28 are received by the mixing chamber for desired interaction. Subsequently, the inflation gases exit inflation apparatus outlets 166 that are formed in the raised section 162, near the edges thereof. Such inflation gases are then received by the inflatable or air bag 32.

Figure 5:
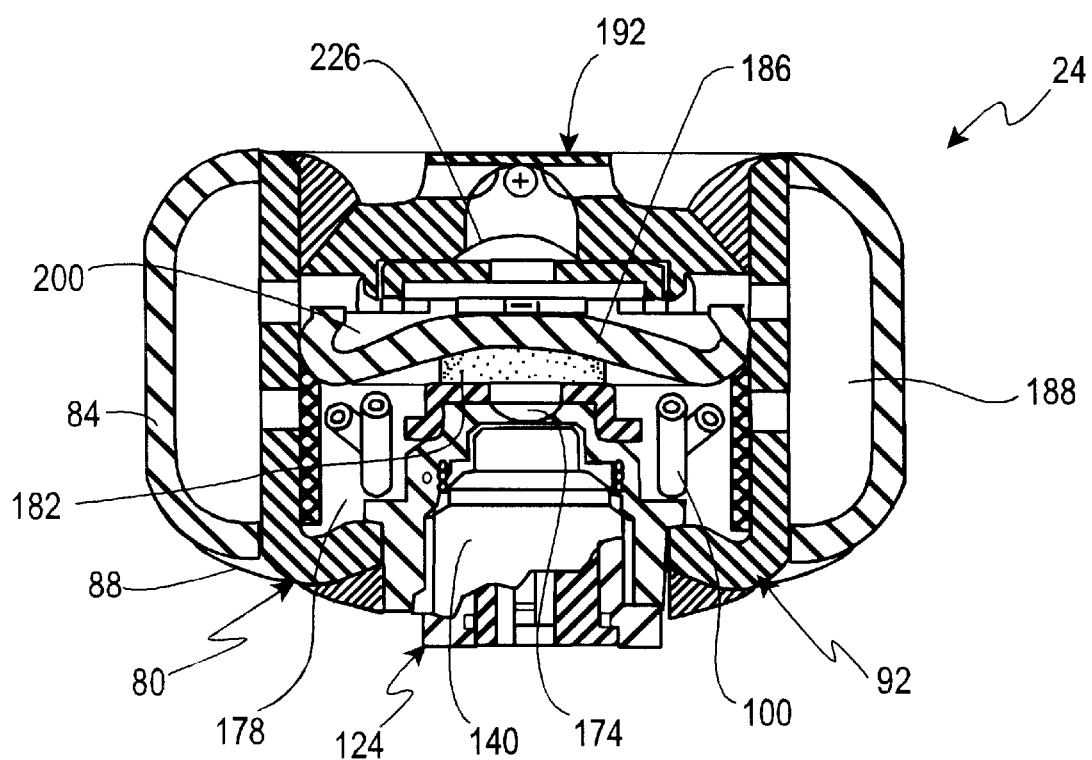
FIG. 5 is a longitudinal cross-sectional view of a representative driver side micro hybrid inflator.

With reference to FIG. 5, one embodiment of a driver side micro hybrid inflator is next described. Generally, this driver side inflator 24 is comparable to previous designs of the assignee of the present application that are disclosed in U.S. Pat. No. 05,553,889 issued Sep. 10, 1996 and pending U.S. patent application Ser. No. 08/680,273 filed Jul. 11, 1996, and which pending application is hereby incorporated by reference, particularly pages 120–128 thereof, together with FIG. 26.

As illustrated in FIG. 5, the micro hybrid inflator 24 includes a central housing assembly 80. The central housing assembly 80 extends through a central portion of a stored gas housing 84. The stored gas housing 84 is suitably attached to the central housing assembly 80, such as by means of one or more spot welds 88. The central housing assembly 80 includes a gas generator 92 that contains hybrid gas generating material or propellant 100. The stored gas housing 84 contains the pressurized medium that mixes with the gases created by the propellant when the micro hybrid inflator 24 is activated. As previously noted, the pressurized medium preferably has an inert gas and oxygen so that the resulting products of combustion when the micro hybrid inflator 24 is activated are oxygen-rich. The propellant 100 is preferably a gun-type propellant that can include a number of different materials having fuel-rich compositions and presently preferred materials that constitute the propellant of the micro hybrid inflator 24 include: RDX, GAP (glycidyl azide polymer), polyacrylate, TMETN, CAB (cellulose acetate butyrate) and MNA (methylnitroaniline).

With respect to the operation of the micro hybrid inflator 24, prior to activation of an initiator 140 of an activation assembly 124, the pressure throughout the inflator 24 is equal. The pressurized medium is contained within a first chamber 178, a second chamber 188 and a third chamber 200. When either a low impact signal or high impact signal is received by the initiator 140, the combustible material of the initiator 140 is ignited. Combustion products from the initiator 140 rupture a first closure disk 174 and ignite ignition/booster material 182. Ignition of the ignition/booster material 182 then ignites the propellant 100. All propellant gases and other combustion products from the activation assembly 124 flow from the first chamber 178 into the second chamber 188 and then into the third chamber 200. A partition 186 substantially prevents any propellant gases from flowing directly from the first chamber 178 into the third chamber 200. Once the pressure within the third chamber 200 reaches a predetermined level, a second closure disk 226 ruptures such that flow of inflation gases is provided to the air bag 32 through an outlet assembly 192.

Figure 6:
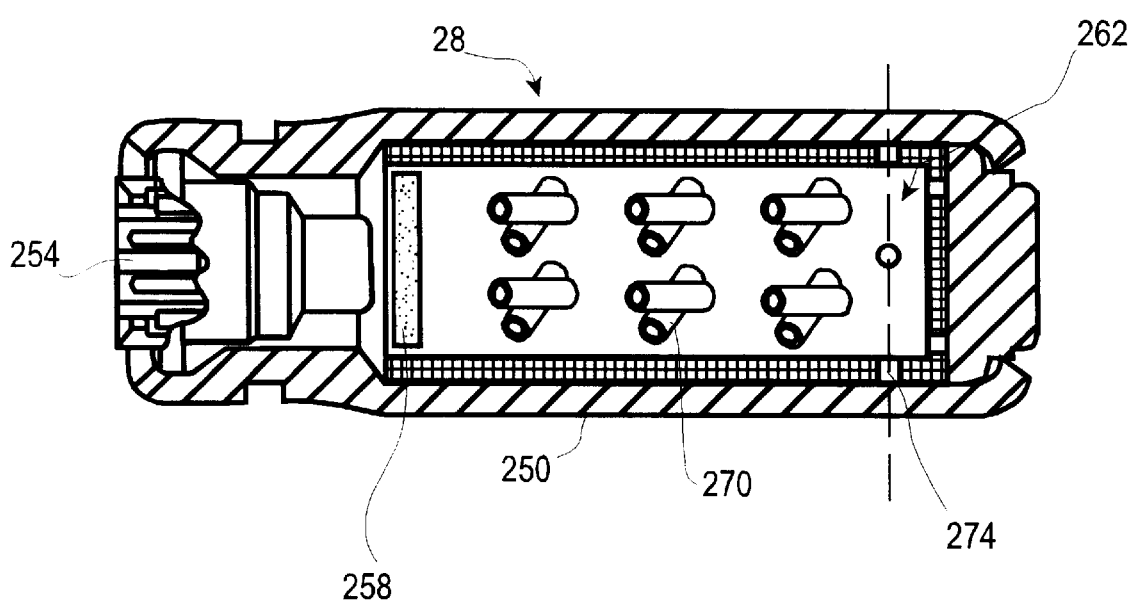
FIG. 6 is a longitudinal cross-sectional view of a representative pyrotechnic inflator.

With reference to FIG. 6, a description of one embodiment of the pyrotechnic inflator 28 is next provided. As seen in FIG. 6, the pyrotechnic inflator 28 has an inflator housing 250 that is elongated and has first and second ends, with an initiator assembly 254 held at the first end of the inflator housing 250. Inward of the initiator assembly 254 and adjacent thereto is an ignition/booster material 258. The ignition/booster material 258 is disposed within a chamber defined by a cylindrical side wall of the inflator housing 250. The ignition/booster material 258 can comprise a number of compositions useful in igniting or activating pyrotechnic gas generating material or propellant 270 also contained within the chamber 262. Such ignition/booster material 258 can include RDX, aluminum and hydroxypropyl-cellulose.

The pyrotechnic propellant 270 has a fuel-rich composition for generating inflation gases when ignited in the chamber 262. As previously noted, the chamber 262 is free of a pressurized medium; however, it does contain ambient air in the spaces unoccupied by the ignition/booster material 258 and the propellant 270. The outlet 274, in the illustrated embodiment, extends circumferentially about the inflator housing 250. The outlet 274 is sealed by adhesive foil or the like, to isolate the propellant 270 from environmental exposure. Adjacent the inner wall of the inflator housing 250 is a screen or like device that has filtering capabilities for preventing unwanted propellant particles of too great a size from exiting the chamber 260 through the outlet 274 and into the air bag 32. In that regard, when the initiator assembly 254 receives a high impact signal that triggers its activation, combustion products produced from the initiator assembly 254 activate the ignition/booster material 258. The products of combustion resulting from ignition of the material 258 ignite the pyrotechnic propellant 270. Ignition of the propellant 270 generates inflation gases that flow into and through the outlet 274, for passage through the orifice 60 in the support assembly 40.

Figure 7:
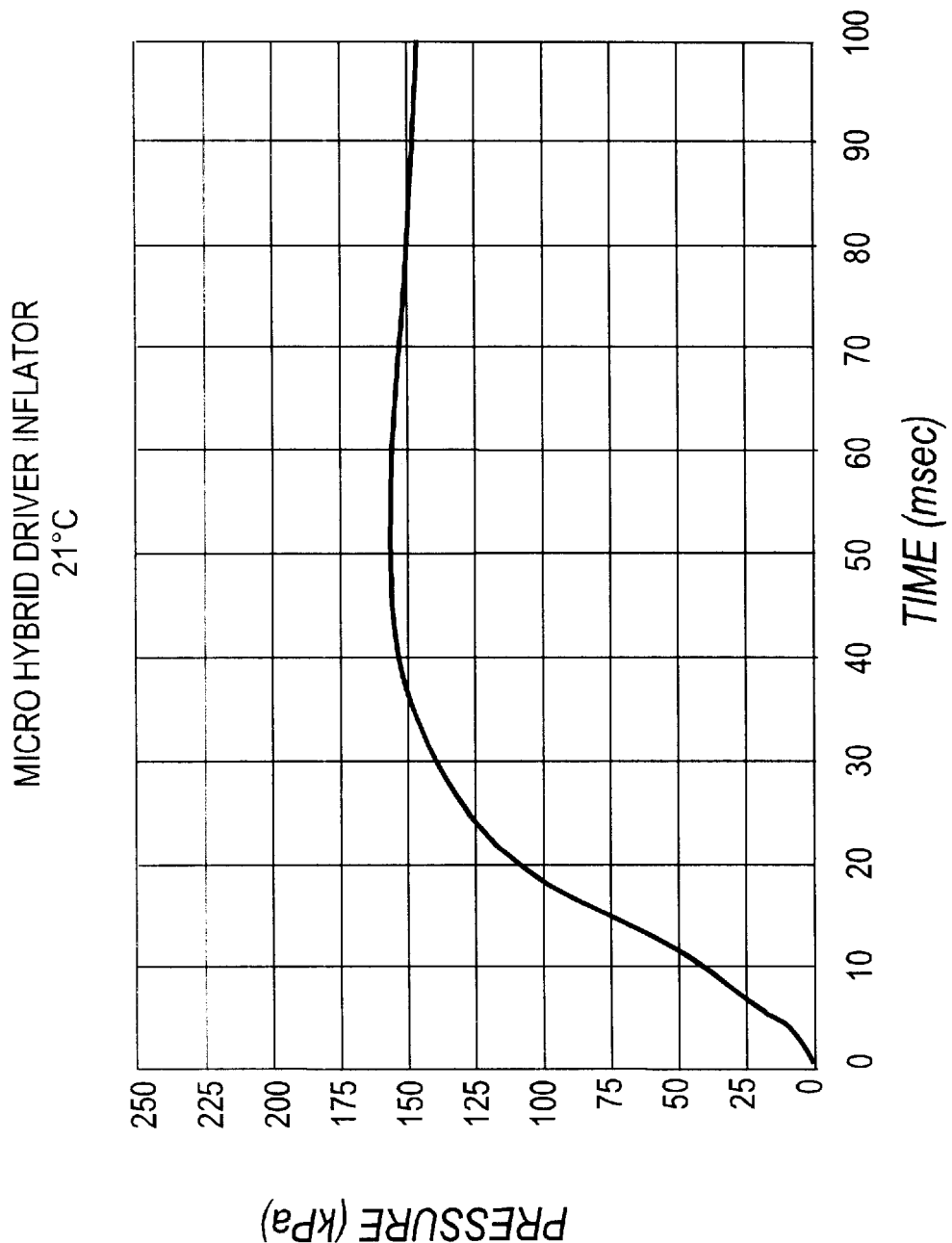
FIG. 7 illustrates a graph related to pressure being developed in a standard testing tank when a driver side micro hybrid inflator is activated.
Figure 8:
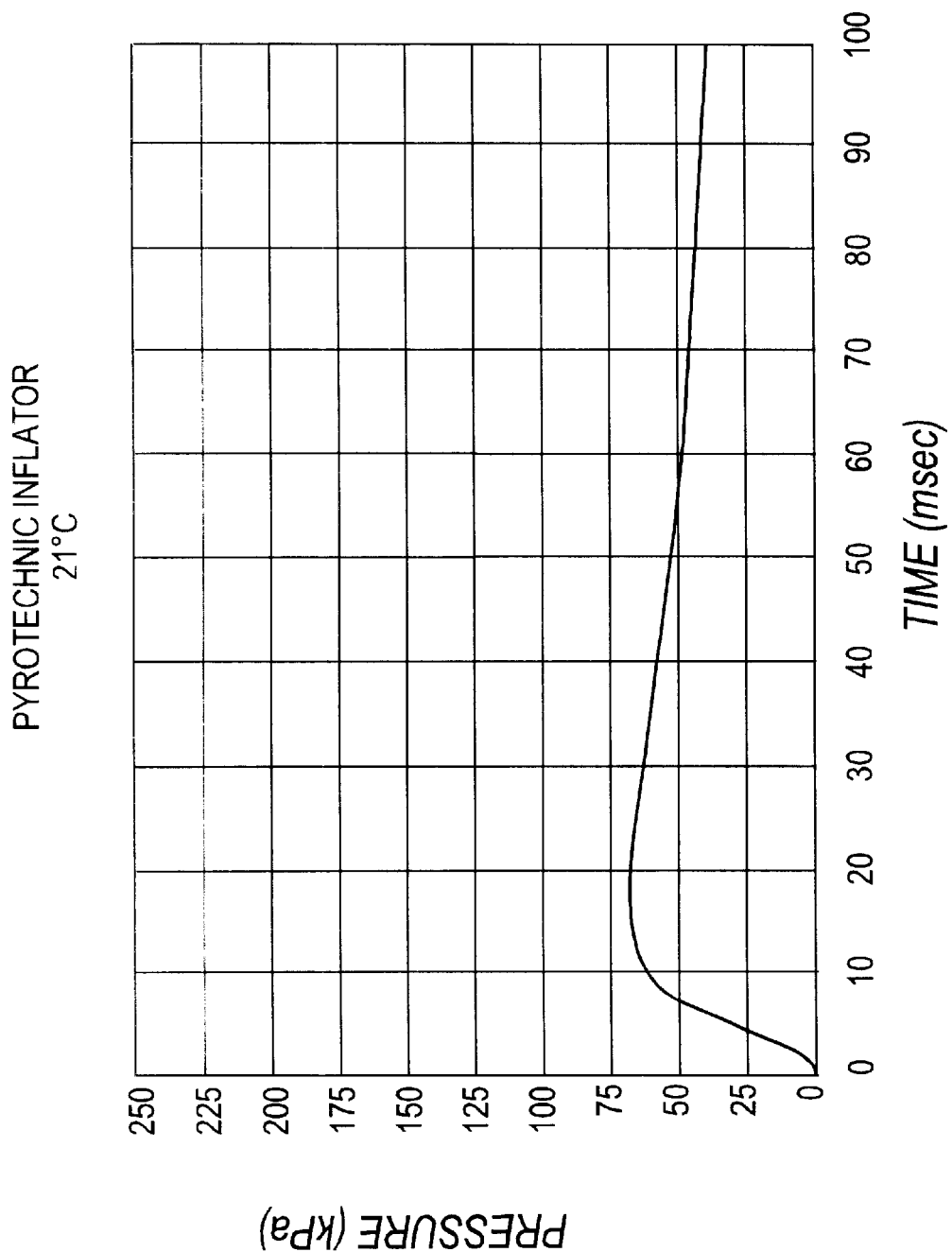
FIG. 8 illustrates a graph related to pressure being developed in the standard testing tank when a pyrotechnic inflator is activated.
Figure 9:
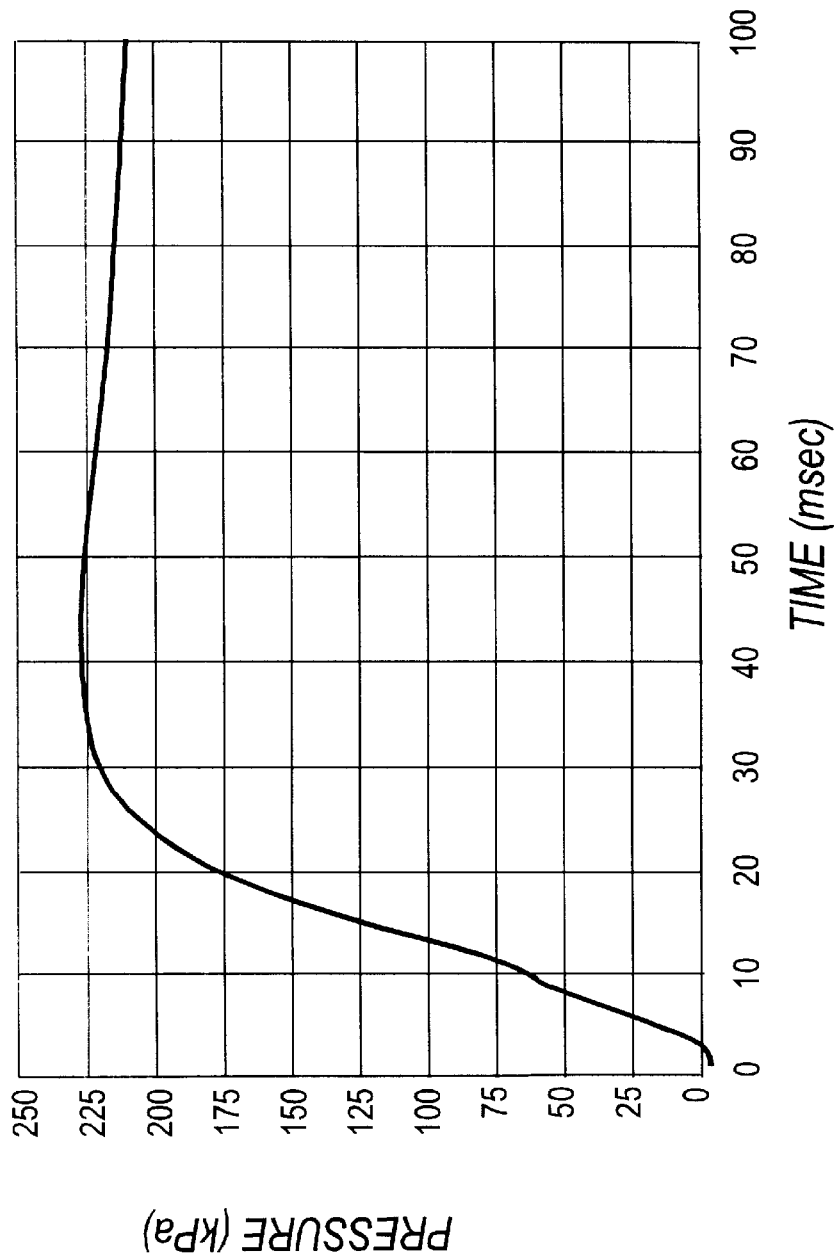
FIG. 9 illustrates a graph related to pressure being developed in the standard testing tank when both the driver side micro hybrid inflator and the pyrotechnic inflator are activated during the same testing operation.

With reference now to FIGS. 7–9, further discussions will be provided related to the operations associated with the two different inflators 24, 28. More specifically, a number of tests were conducted to determine whether or not the micro hybrid inflator 24, which contains an excess of oxygen gas, could effectively complete the combustion process of the substantially less or under-oxidized pyrotechnic inflator 28. This testing has relevance to situations in which the pyrotechnic inflator 28 is only used when a second predetermined condition occurred, such as when a vehicle experiences a high impact collision and both the micro hybrid inflator 24 and the pyrotechnic inflator 28 are activated for inflating the air bag 32.

In conjunction with these tests, with reference to FIG. 7, the pyrotechnic inflator 28 was tuned in at a 65 kPa output in an ambient 60 liter tank and the micro hybrid inflator 24 was tuned in at 165 kPa in an ambient 60 liter tank. The pyrotechnic inflator 28 was tuned in air to facilitate reaction of its products with the oxygen contained in the air, which was intended to simulate the reaction expected when deployed with a micro hybrid inflator 24. Both inflators were then fired simultaneously in a 60 liter tank at 21° C., as illustrated in FIG. 8.

As illustrated in FIG. 9, when the two inflators, 24, 28 were fired simultaneously or during the same operation or test, the result was an additive output of the pyrotechnic inflator 28 in air and the micro hybrid inflator 24. The toxicity measurements, specifically that of CO and $NO_x$, were lower when the pyrotechnic inflator 28 was deployed with the micro hybrid inflator 24. Based on this, the conclusion is reached that a beneficial reaction results between the oxygen gas from the micro hybrid inflator 24 and the products of combustion from the pyrotechnic inflator 28 when these two inflators are fired or used during the same operation or test.

Figure 10:
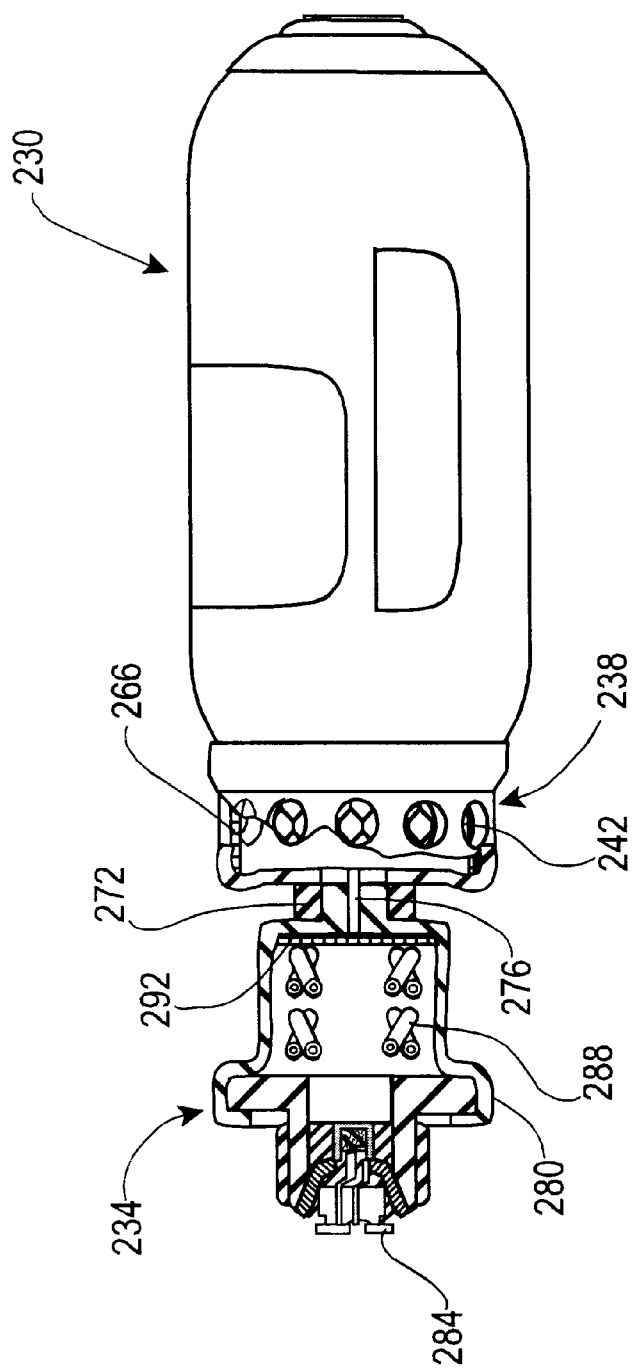
FIG. 10 illustrates a side elevational view of a passenger side hybrid inflator joined to a pyrotechnic inflator that is presented in cross-section.

With reference to FIG. 10, a passenger side inflator apparatus is illustrated and includes a micro hybrid inflator 230 and a pyrotechnic inflator 234. The micro hybrid inflator 230 can include a number of different designs and configurations including those described in U.S. Pat. No. 5,553,889 and pending U.S. patent application Ser. No. 08/680,273 filed Jul. 11, 1996, which is incorporated by reference, particularly pages 108–119 thereof, together with drawing FIG. 25. The micro hybrid inflator 230 includes a gas generating material and a pressurized medium. Like the previous micro hybrid inflators discussed, the gas generating material or propellant is preferably gun-type and is fuel-rich. The pressurized medium includes oxygen and an inert gas, such as argon. As illustrated in FIG. 10, the micro hybrid inflator 230 also has a diffuser assembly 238 at an output end. The diffuser assembly 238 has one or more diffuser outlets 242 that communicate with the inflatable or air bag 32. A screen or other particulate filtering mechanism 266 is disposed within the diffuser assembly 238 in order to prevent unwanted escape of particles that are greater than a threshold size. An opening is formed in the diffuser assembly 238. A common connector 272 is located in this opening. The common connector 272 is attached to the diffuser assembly 238 and the pyrotechnic inflator 234. The common connector 272 has a passageway 276 that enables products of combustion, including inflation gases, to pass from the pyrotechnic inflator 234 to the diffuser assembly 238 of the micro hybrid inflator 230. The pyrotechnic inflator 234 has a housing 280 that is attached to the diffuser assembly 238 at the common connector 272. Like the micro hybrid inflator 230, the pyrotechnic inflator 234 has an initiator assembly 284 for igniting or activating gas generating material or propellant 288 contained within the housing 280 of the pyrotechnic inflator 234. The propellant 288 is preferably gun-type and fuel-rich. In the absence of oxygen from the micro hybrid inflator 230, after activation of the two inflators 230, 234, an unacceptable amount of toxic gas, such as CO, is present. A screen member or other filtering type device 292 is disposed between the gas generating material 288 and the passageway 276 to remove or otherwise prevent unwanted propellant particles of a threshold size or greater from escaping the pyrotechnic inflator 234 into the diffuser assembly 238.

Assume that both inflators, 230, 234, are activated. Products of combustion including inflation gases that are fuel-rich pass from the pyrotechnic inflator 234 into the diffuser assembly 238 of the micro hybrid inflator 230. In the diffuser assembly 238, such fuel-rich products of combustion react or otherwise combine with the relatively oxygen-rich products of combustion including inflation gases from the micro hybrid inflator 230. The mixing and combining of products of combustion from these two inflators, 230, 234, occur within the diffuser assembly 238, unlike embodiments previously described in which such combining occurred in the inflatable or air bag 32 itself or a mixing chamber provided by a flange assembly.

Figure 11:
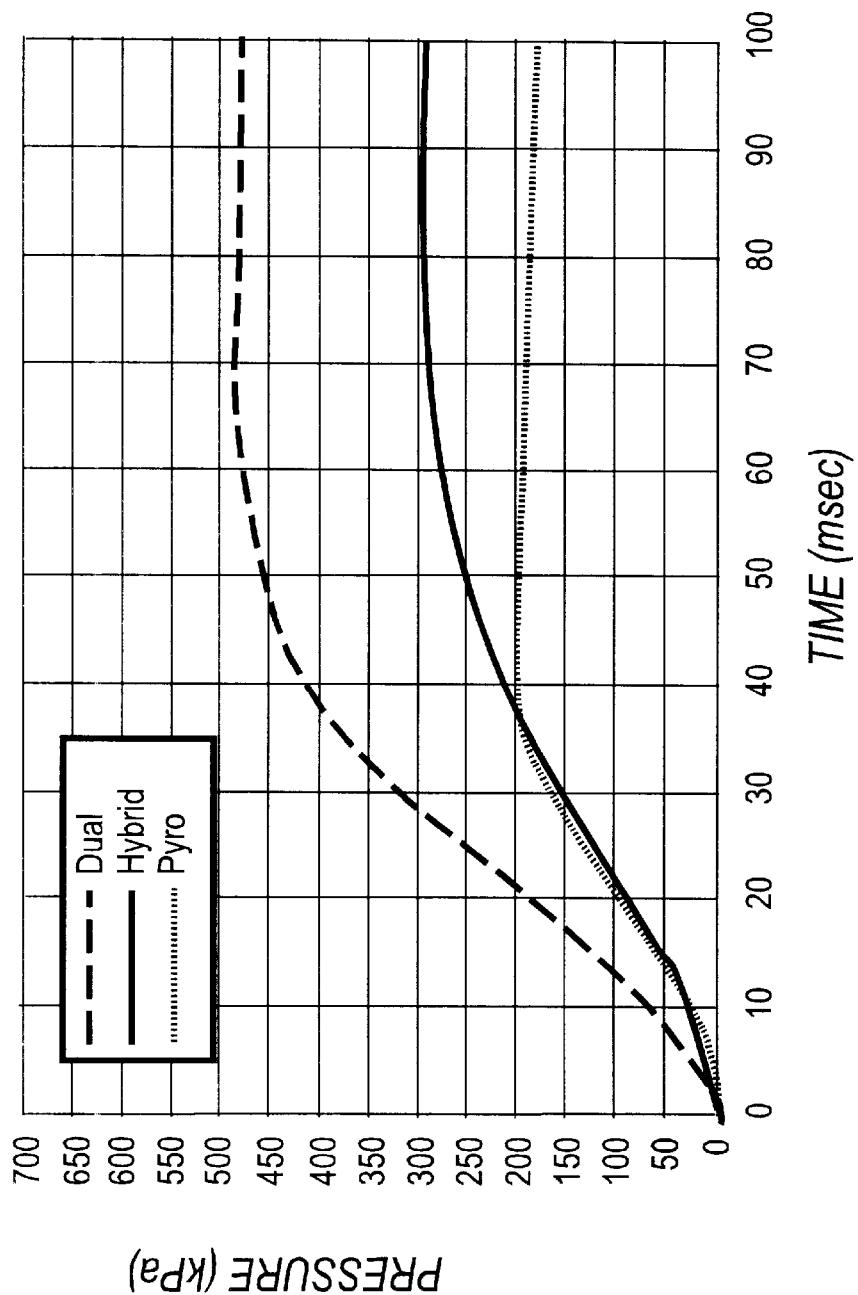
FIG. 11 illustrates a number of graphs related to pressure being developed in the standard testing tank when passenger side micro hybrid and pyrotechnic inflators are activated simultaneously.
Figure 12:
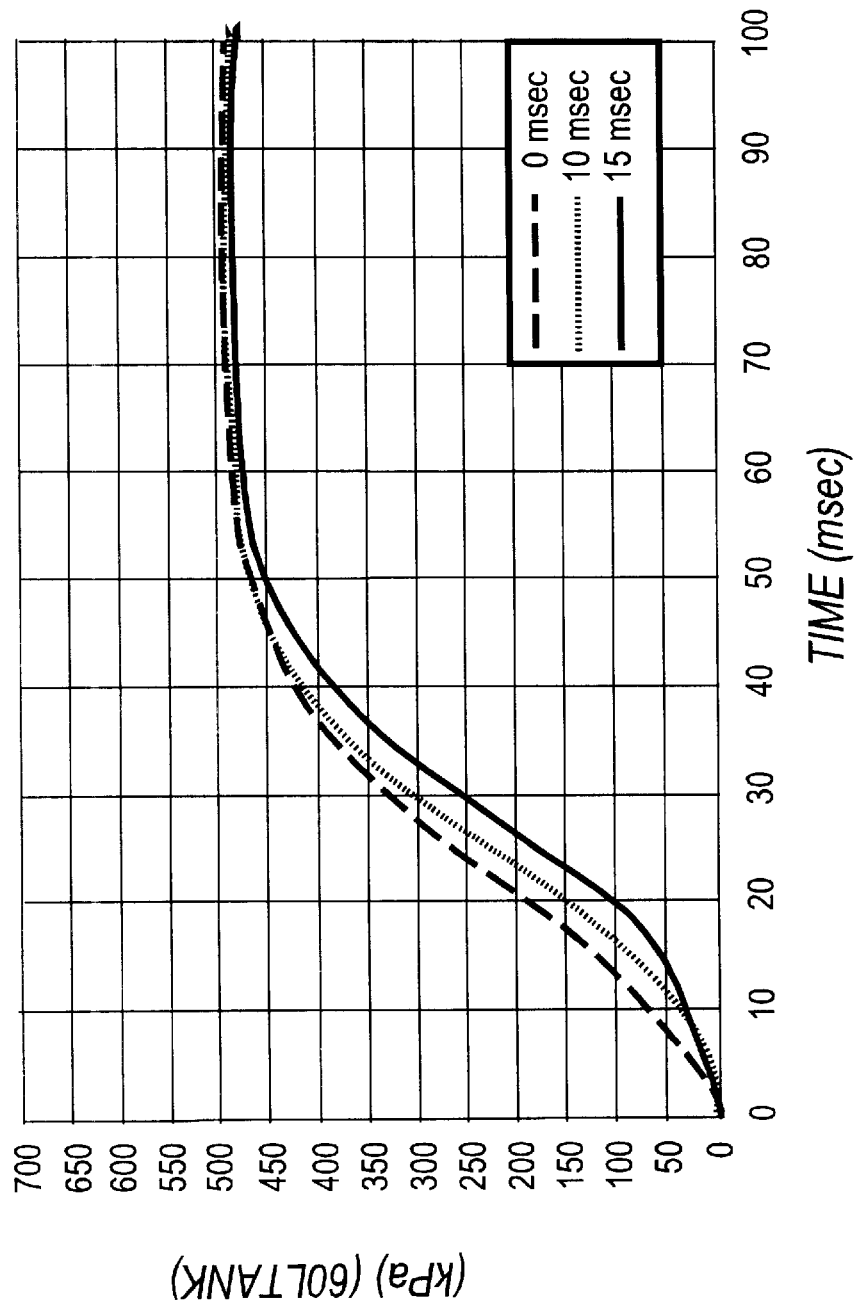
FIG. 12 illustrates a number of graphs related to pressure being developed in a standard testing tank when a passenger side micro hybrid inflator is activated and then, after a delay, a pyrotechnic inflator is activated.

Referring to FIGS. 11 and 12, representative graphs are provided illustrating relevant testing associated with the inflation apparatus of FIG. 10. As seen in FIG. 11, like the driver side embodiment, when both inflators 230, 234 are activated, the pressure developed in the tank is a combination of the inflation gases produced by both inflators 230, 234. The micro hybrid inflator 230 inflation gases constitute substantially more (almost twice as much or more) than the inflation gases produced by the pyrotechnic inflator 234. Unlike FIG. 11, FIG. 12 illustrates an embodiment in which a delay is provided between activation of the micro hybrid inflator 230 and the pyrotechnic inflator 234. In the embodiment illustrated, two different delays are shown, 10 milliseconds and 15 milliseconds. Such a delay affects the graph or curve representing the pressure being developed in the tank, at least along certain time intervals associated with the graph or curve representing the pressure being developed in the tank. The delay is determined by the vehicle collision detection apparatus 36, and is typically 5–40 milliseconds for intermediate impact collision.

Figure 13:
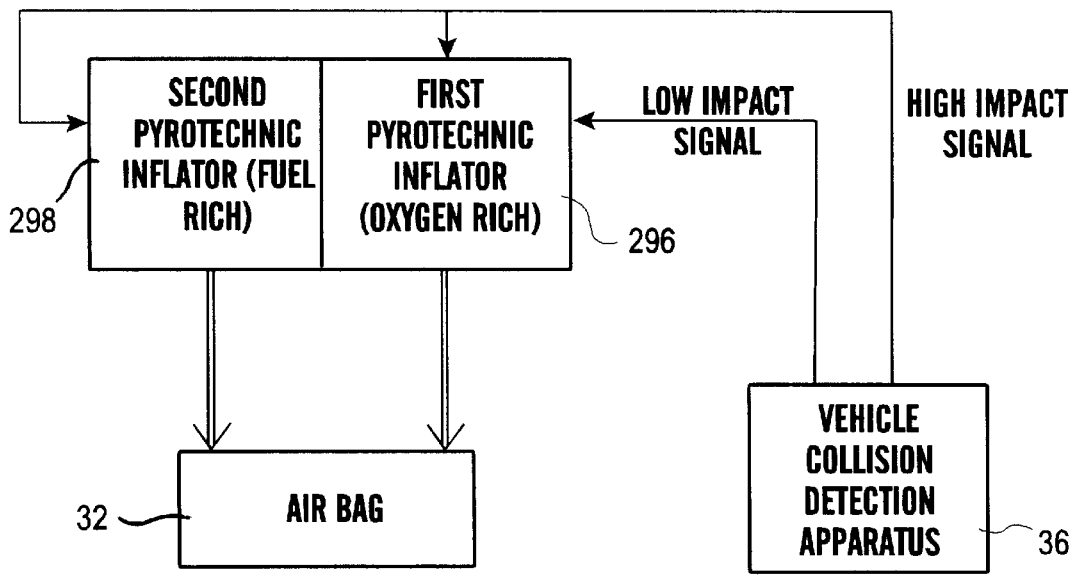
FIG. 13 is a block diagram representative of an inflation system that includes two pyrotechnic inflators, which are not identical.

In addition to embodiments having hybrid and pyrotechnic inflators, a further embodiment involves the use of two pyrotechnic inflators 296, 298 in which there is essentially no pressurized medium including oxygen being stored in either of the two inflators. With reference to the block diagram of FIG. 13, an inflation apparatus is illustrated that includes two pyrotechnic inflators instead of one pyrotechnic inflator and a hybrid inflator. A first pyrotechnic inflator 296 includes a gas generating material and propellant and an initiator assembly for igniting the propellant. Unlike the previously described pyrotechnic inflators, the propellant of this first pyrotechnic inflator 296 is oxygen-rich rather than being fuel-rich. Generally, an oxygen-rich propellant formulation is one in which oxygen-rich gas is produced when the propellant is combusted and such is accomplished by providing sufficient propellant to sustain combustion thereof but insufficient to react all the oxygen that is produced. Such propellants can be metallic, non-metallic or organic. An example of such oxygen-rich pyrotechnic formulations is given in U.S. Pat. No. 3,797,854. In addition to such particular compositions, a broad spectrum of compositions can be utilized to provide an oxygen-rich propellant, such as by using ammonium or metal chlorites, chlorates, perchlorates and nitrates.

The second pyrotechnic inflator 298 also includes a gas generating material or propellant, as well as an initiator assembly to activate the propellant. Unlike the oxygen-rich propellant of the first pyrotechnic inflator 296, the second pyrotechnic inflator has a fuel-rich propellant, such as the gun-type propellants, that have been previously discussed related to other embodiments herein. Consequently, when the a propellant of the second pyrotechnic inflator 298 is ignited, there is insufficient oxygen to cause desired reactions for the purpose of eliminating or acceptably reducing the presence of toxic gas that is generated by the fuel-rich propellant. However, when both inflators 296, 298 are activated, the products generated by them are combined to eliminate or acceptably reduce the presence of toxic gas caused by the activation of the inflators 296, 298 particularly the second pyrotechnic inflator 298.

During anticipated operation involving the two inflators 296, 298, the vehicle collision detection apparatus 36 provides a selected one of a low impact signal and a high impact signal, when a vehicle having the dual inflators is involved in a collision. More particularly, when a low impact collision occurs, a low impact signal is generated and only applied to the first pyrotechnic inflator 296 having the oxygen-rich propellant or fuel. The products of combustion including inflation gases generated are sufficient to properly inflate the inflatable or air bag 32 for such a low impact collision. Alternatively, when a high-impact collision occurs, a high-impact signal is generated and applied to each of the two inflators 296, 298, in order to activate each of their initiator assemblies for igniting their respective propellants. Like the embodiment of FIG. 1, the products of combustion are combined or mixed such that the oxygen-rich products of combustion of the first pyrotechnic inflator 296 are useful in further combusting the fuel-rich products of combustion from the second pyrotechnic inflator 298. With respect to where the products of combustion are combined from the two inflators 296, 298, such combining or mixing can be accomplished in accordance with embodiments previously discussed, including one or more of a mixing chamber, a diffuser assembly, and the inflatable itself.

Figure 14:
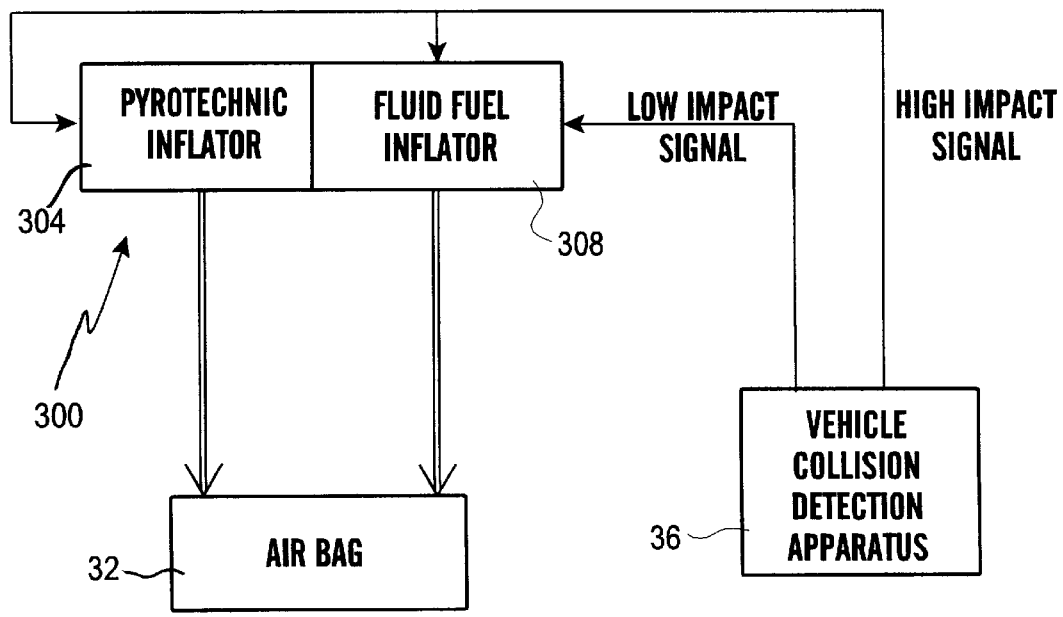
FIG. 14 is a block diagram representative of an inflation system that includes a fluid fuel inflator, in combination with a pyrotechnic inflator.

In another embodiment that employs two different kinds of inflators, reference is made to FIG. 14, which schematically depicts an inflation apparatus 300 comprising multiple inflators, namely a pyrotechnic inflator 304 and a fluid (i.e. liquid or gas) fuel inflator 308. The pyrotechnic inflator 304 is similar to the previously described pyrotechnic inflator 28. Like the pyrotechnic inflator 28, the pyrotechnic inflator 304 of this embodiment is essentially free of pressurized medium and the inflation gases that are generated, when it is activated, are substantially only due to the pyrotechnic gas generating material or propellant contained in the inflator 304.

The fluid fuel inflator 308 is characterized by a liquid or gaseous propellant or fuel, rather than a solid propellant as described in connection with the micro hybrid inflator 24. Representative examples of such fluid fuel inflators are described in U.S. Pat. Nos. 5,348,344 and 5,470,104. When activated, the fluid fuel inflator 308 outputs the inflation gases generated using the fluid fuel to the inflatable or air bag 32. Depending on the detected severity of a vehicle collision, the fluid fuel inflator 308 operates in combination with the pyrotechnic inflator 304. More specifically, as depicted in FIG. 14, when the vehicle collision detection apparatus 36 senses a high impact vehicle collision or condition, the high impact signal triggers both the pyrotechnic inflator 304 and the fluid fuel inflator 308. Like the embodiment of FIG. 13, this embodiment can also utilize one or more of a mixing chamber, diffuser assembly, and the inflatable itself for combining the products of combustion from the two inflators in order to assist or facilitate the generation of further products of combustion including inflation gases from the fuel-rich pyrotechnic inflator 304 due to the reaction with the products of combustion from the gas generating material of the fluid fuel inflator 308.

The foregoing description of the invention has been presented for purposes of illustration and description and is not intended to limit the invention. Variations and modifications commensurate with the above description, together with the skill or knowledge of the relevant art, are within the scope of the present invention. The embodiments described herein are further intended to explain the best mode known for practicing the invention and to enable those skilled in the art to utilize the invention in such best mode or other embodiments, with the various modifications that may be required by the particular application or use of the invention. It is intended that the appended claims be construed to include alternative embodiments to the extent permitted by the prior art.

What is claimed is:

1. An apparatus for use in inflating an inflatable in a vehicle, comprising:
    a first inflator including oxygen gas that is at least present after activation of said first inflator; and
    a second inflator including a pyrotechnic inflator having a pyrotechnic gas generating material and being substantially free of a pressurized medium, said pyrotechnic gas generating material being fuel-rich and generating insufficient oxygen gas such that, in the absence of oxygen gas from said first inflator, after activation of said first and second inflators, an amount of toxic gas is present
    and, when oxygen gas from said first inflator is present, said amount of toxic gas is reduced.

2. An apparatus, as claimed in claim 1, wherein:
    said first inflator includes a hybrid inflator having a hybrid gas generating material and an activation assembly for use in activating said first gas generating material and in which said hybrid inflator activation assembly is activated during each of a high impact collision and a low impact collision of the vehicle.

3. An apparatus, as claimed in claim 1, wherein:
    said pyrotechnic inflator includes an activation assembly for use in activating said pyrotechnic gas generating material when the vehicle is subject to a high impact collision and said pyrotechnic gas generating material is not used to generate inflation gases when the vehicle is subject to a low impact collision.

4. An apparatus, as claimed in claim 1, further including:
    a support assembly that includes a flange assembly having a chamber and in which products of combustion including inflation gases from each of said first and second inflators are combined such that further combustion of said products of combustion of said pyrotechnic gas generating material occurs.

5. An apparatus, as claimed in claim 1, wherein:
said pyrotechnic inflator includes an outlet from which inflation gases exit to the inflatable and also includes a central longitudinal axis, with said outlet being spaced from said central longitudinal axis.

6. An apparatus, as claimed in claim 1, wherein:
said first inflator includes a inflator housing and a diffuser assembly adjacent one end of said inflator housing and in which each of said first and second inflators generate products of combustion including inflation gases when said first and second inflators are activated and in which the products of combustion including the inflation gases from said first and second inflators are combined in said diffuser assembly.

7. An apparatus, as claimed in claim 1, wherein:
said first inflator includes a hybrid inflator that provides a substantially greater pressure increase in the inflatable than said pyrotechnic inflator when said hybrid inflator and said pyrotechnic inflator are activated during filing of the inflatable.

8. An apparatus, as claimed in claim 1, wherein:
said pyrotechnic inflator develops less pressure than is developed by said first inflator.

9. An apparatus, as claimed in claim 1, further including:
a support assembly having a flange with a substantially planar outer surface and concave section, with said pyrotechnic inflator being disposed at an oblique angle relative to said outer surface.

10. An apparatus, as claimed in claim 1, wherein:
each of said first and second inflators, when activated, outputs products of combustion including inflation gases and in which the products of combustion from said second inflator are further combusted using the products of combustion of said first inflator in the inflatable.

11. An apparatus, as claimed in claim 1, wherein:
the oxygen gas of said first inflator after activation thereof has a concentration of at least 2% of the gas of said first inflator.

12. An apparatus, as claimed in claim 1, wherein:
concentration of the oxygen gas after activation of said first inflator is in the range of about 2%–30% of the gas in said first inflator.

13. An apparatus, as claimed in claim 1, wherein:
said first inflator includes a fluid fuel.

14. An apparatus, as claimed in claim 1, wherein:
said first inflator includes at least one inert gas and oxygen for use in combining with products of combustion from said pyrotechnic inflator.

15. An apparatus, as claimed in claim 1, wherein:
said first inflator includes a pyrotechnic inflator and said oxygen gas is present only after activation of said pyrotechnic inflator.

16. A method for inflating an inflatable located in a vehicle, comprising:
generating first products of combustion including inflation gases that are oxygen-rich when a first inflator is activated;
generating second products of combustion including inflation gases that are fuel-rich when a second inflator is activated and wherein, in the absence of said products of combustion from said first inflator, an amount of toxic gas is present;
combining said first products of combustion and said second products of combustion wherein, after said combining step, an acceptable amount of toxic gas is present.

17. A method, as claimed in claim 16, wherein:
said step of generating said first products of combustion includes initiating activation of said first inflator when each of a low impact signal and high impact signal is received by said first inflator.

18. A method, as claimed in claim 16, wherein:
said step of generating said second products of combustion includes initiating activation of said second inflator only when a high impact signal is received by said second inflator.

19. A method, as claimed in claim 16, wherein:
said step of generating said first products of combustion includes using an oxygen-rich gas generating material contained in said first inflator.

20. A method, as claimed in claim 16, wherein:
said step of generating said second products of combustion includes using a fuel-rich propellant contained in said second inflator.

21. A method, as claimed in claim 16, wherein;
said step of generating said first products of combustion includes providing an oxygen concentration of at least 2% of said inflation gases using said first inflator.

22. A method, as claimed in claim 16, wherein:
said combining step includes supporting said first and second inflators using a flange assembly and receiving said inflation gases from each of said first and second inflators in a chamber of said flange assembly.

23. A method, as claimed in claim 16, wherein:
said first inflator includes an inflator housing and a diffuser assembly disposed adjacent an end of said inflator housing and in which said combining step includes receiving said inflation gases from each of said first and second inflators in said diffuser assembly.

24. A method, as claimed in claim 16, wherein:
said combining step includes mixing said first products of combustion and said second products of combustion in the inflatable to produce further products of combustion.

* * * * *